INVENTORS.
WILLIAM CULSHAW
JOHN A. DAHLQUIST
DON G. PETERSON
BY

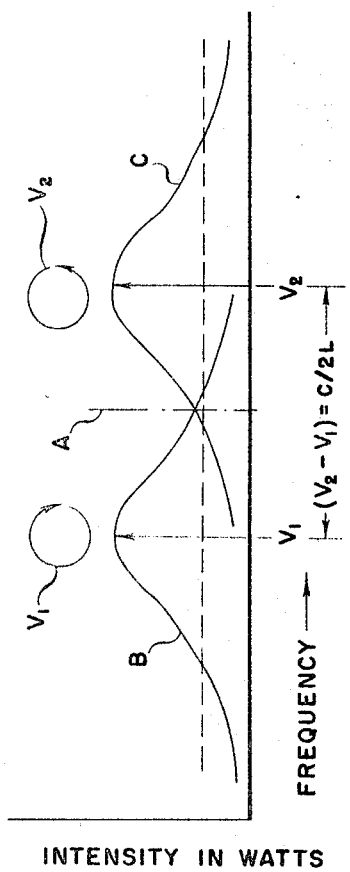
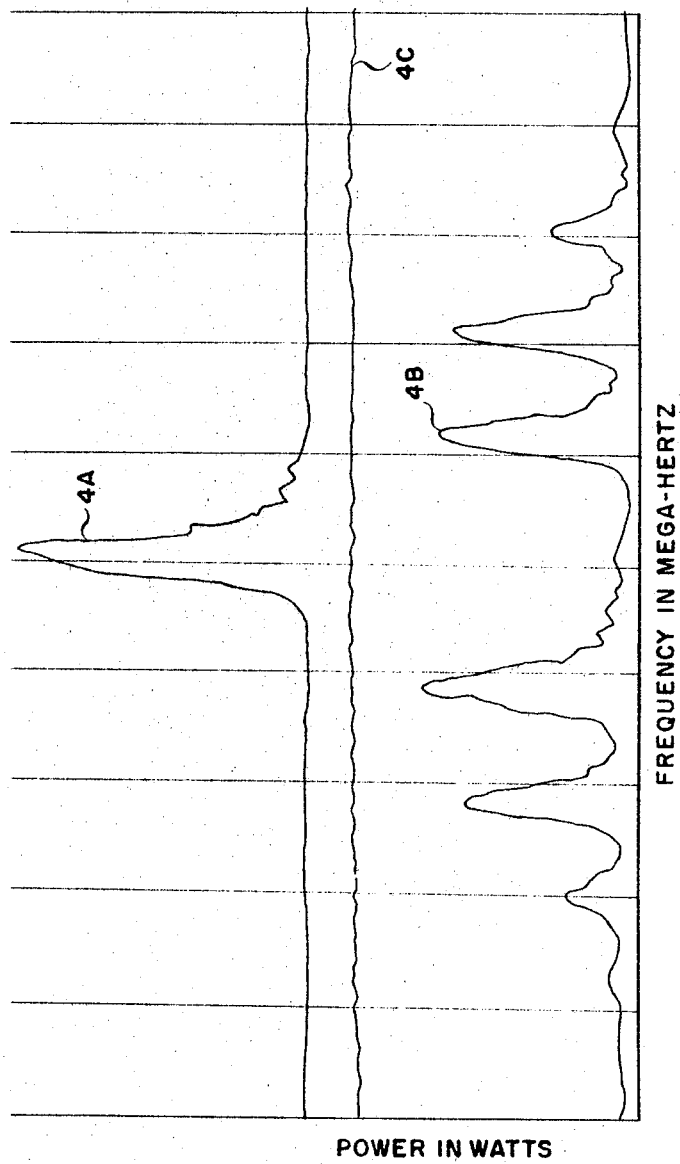
FIG. 2
FIG. 4
INVENTORS.
WILLIAM CULSHAW
JOHN A. DAHLQUIST
DON G. PETERSON
BY
*George C. Sullivan*
Agent

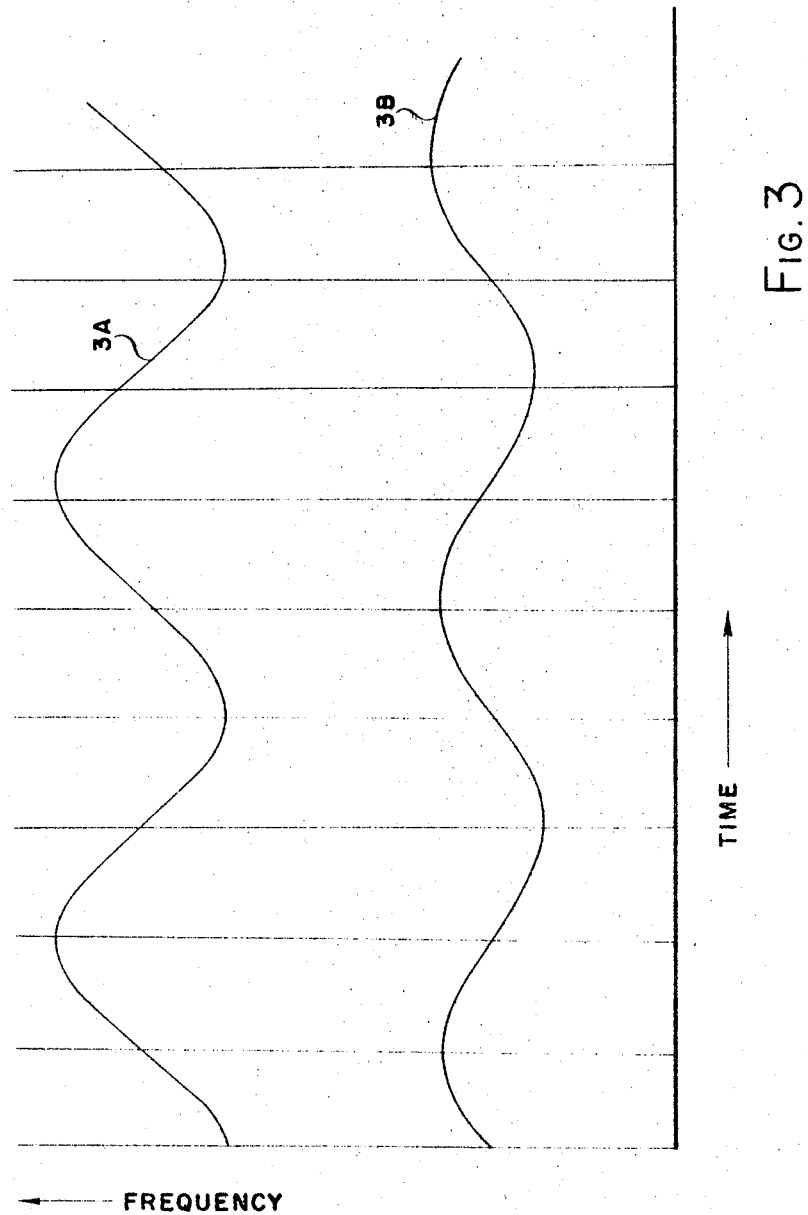

Agent

United States Patent Office 3,463,924
Patented Aug. 26, 1969

3,463,924
OPPOSITE CIRCULARLY-POLARIZED OPTICAL HETERODYNE DETECTION SYSTEM
William Culshaw, Los Altos, and John A. Dahlquist and Don G. Peterson, Palo Alto, Calif., assignors to Lockheed Aircraft Corporation, Burbank, Calif.
Filed Dec. 16, 1966, Ser. No. 605,125
Int. Cl. H04b 9/00
U.S. Cl. 250—199        7 Claims

ABSTRACT OF THE DISCLOSURE

A helium-neon gas laser with an axial magnetic field produces interaction between two oscillation modes of widely separated frequency oppositely circularly-polarized components of the atomic transition of the neon gas utilized in the laser. The two oscillation modes have different frequencies and are separable during the measuring event within the system for recombination to produce optical heterodyne signals for precision measurement and communication purposes.

---

In the prior art modulation and detection systems are well known which utilize light beams generated by an incandescent lamp passed through a collimator to produce a collimated light beam, and with the advent of the continuous-wave gas laser either single laser or double laser device arrangements have been utilized to generate the light beam in such systems. A typical system for utilizing an incandescent lamp for the generation of the light beam in a modulation and detection system is described in U.S. Patent No. 3,175,088 entitled "Optical Frequency Modulation and Heterodyne Recovery System," issued to Donald R. Herriott on Mar. 23, 1965; the use of a single mode oscillation laser device in a system is illustrated in an article from the proceeding of the IEEE dated Mar. 1966, entitled "Laser Doppler Velocimeter for Measurement of Localized Flow of Velocities in Liquids" by J. W. Foreman, Jr. et al. on pages 424 and 425; and the use of two laser devices in a system is illustrated by an article in the "Electronic News," June 27, 1966, page 6, covering work on earthquake prediction, wherein two continuous-wave helium-neon gas lasers with outputs at 6,328 Angstroms and 11,500 Angstroms respectively are utilized. Each of the foregoing arrangements has shortcomings in that they would be incapable of providing the required functions and results produced by the present invention owing to the fact that the system would be unduly complicated, unstable, cumbersome, and expensive.

The present invention avoids the foregoing disadvantages of the prior art by the use of a unique gaseous laser with an associated axial magnetic field which generates an optical output beam having oppositely or right and left hand circularly polarized modes of oscillation that are widely separated in frequency. The wide frequency separation between the two oppositely circularly polarized oscillation modes make them uniquely adaptable for use in producing optical heterodyne signals for precision measurements of vibration or motion and for communication purposes.

A primary object of the present invention is to provide a unique signal gaseous laser wherein an axial magnetic field of a preselected magnitude is applied to the laser cavity oscillations to provide two axial modes of oscillations which are oppositely circularly-polarized.

Another object of the present invention is to provide a novel single gaseous laser for generating an optical output beam having two oppositely circularly-polarized axial modes of oscillation of different frequencies where in the frequencies are widely separated from one another.

Still another object of the present invention is to provide a single laser for generating an optical output beam having two oppositely circularly-polarized axial modes of oscillation which have inherent constant frequency separation between the mode of oscillations to provide stable heterodyne signals.

Yet another object of the present invention is to provide a laser wherein the axial mode separation of the two oppositely circularly-polarized oscillations are nomially equal to the cavity mode spacing.

While another object of the present invention is to provide a laser wherein the optical output beam having two oppositely circularly-polarized energy waves of different frequencies which are readily separated by polarization devices thereby avoiding the use of complex frequency selective devices.

A further object of the invention is to provide a novel laser for heterodyne detection in an apparatus utilized for the measurement of motion and vibration of objects.

A yet further object of the invention is the provision of a system wherein one orthogonal linearly polarized wave of the laser output is utilized as a reference or optical heterodyne local oscillator signal and the second wave of the output is utilized as an optical carrier signal for information transmission or target motion analysis.

Yet another object of the present invention is to provide optical frequency difference (heterodyne) signals in a frequency region that allows the suppression of low frequency noise inherent in many optical detectors.

The novel features which are believed to be characteristic of the invention, both as to its organization and method of construction and operation, together with further objecs and advantages thereof, will be better understood from the following description considered in connection with the accompanying drawings in which that embodiment of the invention is disclosed by way of example. It is expressly understood, however, that the drawings are for the purpose of illustration and description only and do not define limitations of the invention.

In the drawings:

FIGURE 2 is plot of the oscillatory modes contained in the optical output beam generated by the continuous-wave gaseous laser shown in FIGURE 1;

FIGURE 3 illustrates phase modulation of laser beam shown in FIGURE 1 and shows the resulting Doppler shift of a sine wave;

FIGURE 4 is an oscilloscope display of a spectrum analyzer output illustrating phase modulation in one arm of the interferometer shown in FIGURE 1.

Figure 1:
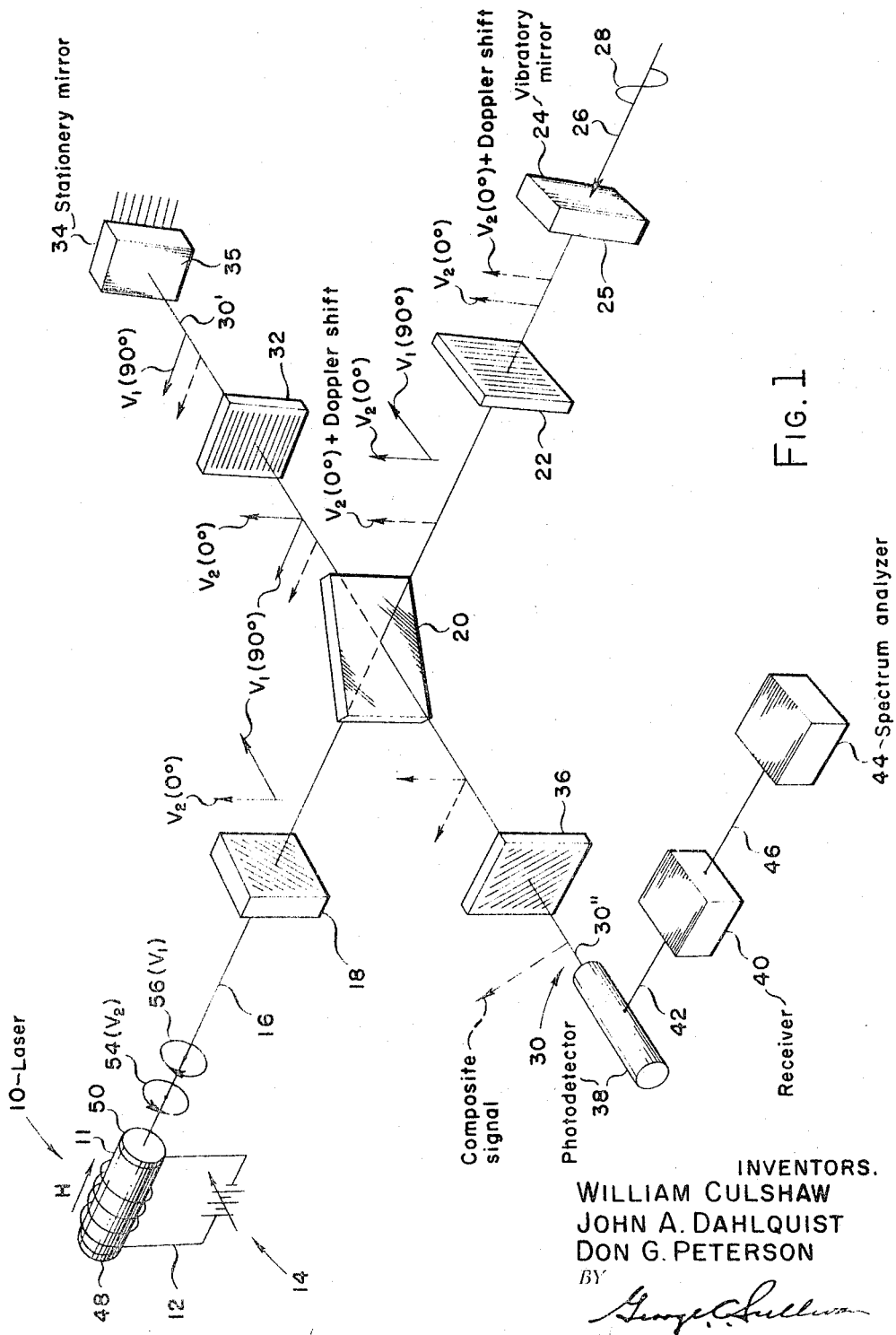
FIGURE 1 is a schematic view of an illustrative embodiment of the present invention.

With reference to the drawings, FIGURE 1 shows an improved gaseous laser utilized in a detection system for the measurement of vibrations of objects. The apparatus shown in FIGURE 1 includes a continuous-wave gaseous laser 10 which is energized in any suitable manner known in the art of lasers, the energization system is not illustrated for purposes of brevity. A coil 12 wound concentrically around a gaseous laser cavity 11, which is connected to a variable power source illustrated by a variable battery 14 to provide a magnetic field (H) coaxial with the laser cavity. Disposed along an imaginary line designated as a axis 16 of laser 10 is a quarter wave plate 18 with its optic axis rotated 45° about axis 16. Disposed at the intersection of axis 16 and a second axis generally designated 30 is a partially reflective and transmissive mirror 20, hereinafter referred to as a partial mirror. Further along axis 16 is a zero degree (vertical) polarizer 22, and a representative vibratory body 24 to which a vibratory force 26 illustrated by an arrow is applied. The waveform of the vibratory force 26 is illustrated as a sine wave 28. It should be noted that any form of vibratory or linear motion which is applied may be detected. A leg of the apparatus lies along axis 30 designated as an axis 30', which passes through partial mirror 20 intersecting axis 16 of laser 10 to form the other arm of the apparatus.

Along axis 30' the partial mirrorf 20 is a 90° (horizontal) polarizer 32 which forms the incident and return paths of one leg of the system and a stationary mirror 34 of high reflectance at the end of this leg of the system. On the other side of the partial mirror 20, the other leg of the return path of the system along axis 30 is a third polarizer 36 which when used in a system such as the present invention to affect a light beam which has already been passed through a previous polarizer is termed an analyzer and will be referred to as such hereinatfer in the specification and in the claims, and a photodetector 38 in alignment along axis 30. To complete the system the output of the photodetector 38 is coupled to a receiver 40 by a first conductor 42 and the output of receiver 40 is connected to a spectrum analyzer 44 by a second conductor 46.

Referring now to FIGURE 1, and more particularly to gaser laser 10 there is shown a continuous-wave device having a cylindrical cavity 11 disposed between two parallel and almost totally reflective mirrors 48 and 50, where mirror 50 functions as the output end of the laser through which output optical energy is directed along axis 16. As shown in FIGURE 1, mirrors 48 and 50 are perpendicular to axis 16. In conventional lasers windows of the plasma tube are slanted at an angle with respect to the tube axis commonly known as "Brewster's Angle." The Brewster angle windows introduce a polarization constraint on the oscillatory modes of the laser cavity. In the present invention there are no polarization constraints with the mirror placed perpendicular to the axis of the laser.

In the present embodiment of the invention gas such as helium-neon (He-Ne) for an example, has been successfully used as the light amplifying medium. The He-Ne gas has an atomic transition which has been found to work satisfactorily in accordance with the present invention. The use of He-Ne gas is not intended as a limitation of the invention since other gas mixture may be suitable.

To continue, coil 12 and battery 14 provide a magnetic field (H) whose field lines thread through laser cavity 11 along axis 16. The axial magnetic field lines cause the energy levels of the light amplifying medium to split in frequency and polarization so that two of the axial cavity modes oscillate with opposite circular polarization. The oppositely circularly-polarized modes are illustrated as clock-wise 56 and counter clock-wise 54 arrows. The clock-wise wave oscillates at the lower cavity mode frequency $\nu_1$ and the counter clock-wise wave oscillates at the upper cavity mode frequency $\nu_2$ when the magnetic field (H) is in the direction shown in FIGURE 1.

In accordance with the present invention it has been discovered that a laser without polarization constraints (such as produced by Brewster's windows), the application of an axial magnetic field the magnitude of which is determined in accordance with equation:

$$H \approx \frac{C}{4g\nu_e L} \quad (1)$$

where:

H is the magnetic field,
C is the speed of light,
$\nu_e$ is the Larmor frequency in MH$_2$ per gauss,
g is the atomic g factor, and
L is the length of the laser cavity which results in the generation of two different axial cavity mode oscillations of opposite circular polarization that are separated by some multiple of $C/2L$ Hz. That is, the two oscillatory modes in the output have the difference frequency given by the equation:

$$\nu_2 - \nu_1 = \frac{nc}{2L} \quad (2)$$

where:

$\nu_2$ is the upper cavity mode frequency,
$\nu_1$ is the lower cavity mode frequency,
n is a positive integer,
C is the speed of light, and
L is length of the laser cavity.

In FIGURE 2 the two vertical arrows B and C denote the relative magnitudes of the two axial modes of oscillation in the cavity for $n=1$ at frequencies $\nu_1$ and $\nu_2$ and as shown to be equal and symmetrically situated about the center, identified as A, of the He-Ne 632 A. atomic transition $(J=1 \to J=2)$. Since both modes of oscillation, one at frequency $\nu_1$ and the other at frequency $\nu_2$, are generated within the same optical cavity their frequency difference $\nu_1 - \nu_2$ is considerably more constant than if they had been generated within the optical cavity as of two separate free running lasers. More particularly, it has been found that frequency separation is on the order of $10^6$ times more stable than could be accomplished in the prior art. The advantages derived from such constant frequency separation is important to the stability of optical heterodyne systems.

An illustrative example of the parameters which have been utilized in demonstration of the present invention will be given. A laser cavity 11, 73 centimeters long and 3 milicentimeters in diameter is suitable and an axial magnetic field on the order of 50 gauss having a uniform intensity along the axis of the laser, the flux deviation being on the order of one percent as provided by a suitable concentric solenoid coil 12 is also suitable. The frequency separation which could be calculated by using Equation 2 agrees with the frequency separation actually measured, which was 205±5 mHz. The gas pressure in the cavity was on the order of 0.2 torr Ne and 2 torr He. The pressure used is not critical, but has been found to be usable in the range indicated.

With reference again to FIGURE 1 where an embodiment of the invention is shown, a more detailed description of the other elements illustrated therein will be given. As illustrated in FIGURE 1, the optical output of continuous-wave gaseous laser 10 is directed along axis 16 to quarter wave plate 18. The quarter wave plate 18 may be of a suitable birefrigent material, such as mica, for example. The function of this quarter wave plate 18 is to convert the circularly-polarized waves of the laser output beam at frequencies ($\nu_1$ and $\nu_2$) into orthogonal linearly polarized waves such that the two energy waves are useful as a reference and transmission signals.

Partial mirror 20 is shown tilted at a 45° angle with respect to both axes 16 and 30 in a conventional manner in interferometers used in the prior art. The purpose of the tilted partial mirror in the manner illustrated is to divide the energy of the incident beam into two beams, one directed along axis 16 and the other along axis 30'. The 0° (vertical) polarizer 22 may be any suitable polarizing material known and in use in the prior art, the function of which is to permit the 0° vertically polarized wave at frequency $\nu_2$ to pass therethrough with only slight attenuation and to block the 90° (horizontal) polarized wave at frequency $\nu_1$. Mirror 24 is one which may be affixed to a body which is vibrated or it may be the body which is vibrated. It has a highly reflective surface 25 such that essentially all of the light beam energy impinging thereon is reflected. It may also be a diffuse reflecting surface (non-specular) of a vibrating structure, as will be well discussed in connection with FIGURE 5.

Along another branch of the device axis 30', a 90° (horizontal) polarizer 32 is disposed and is of any suitable material similar to polarizer 22 but differing in that it has the characterization of permitting only those waves which have horizontal polarization to pass therethrough. Mirror 34 is similar to 24 in that essentially all of the light beam energy impinging thereon is totally reflected from surface 35, but differs in that it is a fixed member of the system.

Continuing with the discussion of FIGURE 1, analyzer 36, which is illustrated as being rotated 45° around axis 30″ such that it passes a component of each reflected beam of frequencies $\nu_1$ and $\nu_2$ plus Doppler shift therethrough altering the waves in a manner which will be discussed hereinafter. After passing through analyzer 36 the waves of frequency $\nu_1$ and $\nu_2$ plus Doppler shift enter the photodetector 38 where an output signal is generated and subsequently passed through the series-connected receiver 40 and spectrum analyzer 44 to provide a means for determining the vibratory characteristics of the motion applied to surface 24 by a force as illustrated by arrow 26 and sine wave 28. It should be noted at this point that the output from photodetector 38 need not be analyzed by spectrum analyzer but may be any one of several other means of analysis.

Operation of the system will be set forth hereinbelow with reference to FIGURES 1 and 2. Operation of the system is initiated by the excitation of (He-Ne) laser 10 under the influence of the magnetic field (H) generated by a solenoid illustrated by coil 12 and variable current supply 14. It should be noted at this point that the magnetic field provided by solenoid 12 and variable current source 14 may be substituted for by a permanent magnet arrangement whose design will permit the creation of a uniform axial magnetic field for the laser. For example, a permanent magnet similar to the type utilized in the traveling wave tube art might readily be adapted for use in connection with the laser. Once the laser has been actuated it oscillates at two axial mode frequencies $\nu_1$ and $\nu_2$ of opposite circular polarizations with constant and wide frequency separation. As shown in FIGURE 1, a portion of this energy propagates through output mirror 50 and passes through quarter wave plate 18 whereupon the two waves of opposite circular polarization are converted to orthogonal linearly polarized waves whereby the wave energy at frequency $\nu_1$ has horizontal polarization (90°) and the wave energy at frequency $\nu_2$ has vertical polarization (0°).

For purposes of this discussion the target detection signal has been designated $\nu_2$ (0°), the reference or local oscillator signal has been designated $\nu_1$ (90°). Partial mirror 20 splits the beam into two beams each of which are composed of $\nu_2$ (0°) and $\nu_1$ (90°) energy. Polarizer 22 passes only the $\nu_2$ (0°) energy and polarizer 32 passes only the $\nu_1$ (90°) energy. The reference light signal $\nu_1$ (90°) is then reflected from mirror 34, illustrated as a broken line arrow, back through polarizer 32 and partial mirror 20 as a return wave and arrives at analyzer 36 with the same polarization it had upon emergence from the quarter wave plate 18. The Doppler shifted signal, $\nu_2$ (0°) plus Doppler, returns from mirror 24, illustrated as a broken line arrow, passes through polarizer 22 and is deflected by mirror 20 to analyzer 36. Both the Doppler shifted and reference waves, commonly referred to as output of the interferometer must be co-collimated optical signals, and as such are received by photodetector 38 as they pass through analyzer 36 to provide an output signal to receiver 40 along conductor 42. As the waves pass through analyzer 36 co-polarized signals are produced. As indicated previously, analyzer 36 is rotated about axis 30″ so that it transmits a component of each signal wave previously designated $\nu_1$ (90°) and $\nu_2$ (0°) plus Doppler. The magnitude of each transmitted component is proportional to the cosine of the angle between the polarization direction of the incident waves and the polarization direction of the analyzer 36. The signals passing through analyzer 36 are thus co-polarized and co-collimated and produce heterodyne interference signals in the photodetector 38.

Continuing with the discussion of operation of the invention, it is well known that the output current $i(t)$ of photodetector 38 exhibits the square law relationship as expressed by the following equation:

$$i(t) = \alpha(E(t)) \quad (3)$$

where $i(t)$ is the output photocurrent, $\alpha$ is a proportionality constant, and $E(t)$ is the electric field intensity of the optical wave striking the photodetector.

The heterodyne signal current is derived by considering the output of the two-frequency interferometer waves $\nu_1(90°)$ and $\nu_2(0°)$ plus Doppler which is expressed by the following equation:

$$E(t) = E_1 \cos(2\pi\nu_1 t) + E_2 \cos(2\pi\nu_2 t + \phi(t)) \quad (4)$$

where:

$E_1 \cos(2\pi\nu_1)$ is the signal from the reference arm,
$E_2 \cos(2\pi\nu_2 t + \phi(t))$ is the phase modulated transmission signal from the target arm ($\nu_2$ and Doppler).

Substituting Eq. 4 in Eq. 3, and retaining only those frequency components that are within the output capabilities of the photodetector, we obtain:

$$i(t) = \alpha\left\{\frac{E_1^2}{2} + \frac{E_2^2}{2} + E_1 E_2 \cos[2\pi(\nu_2 - \nu_1)t + \phi(t)]\right\} \quad (5)$$

In contrast the signal frequency interferometer of the prior art utilizing a single laser device has $\nu_1 = \nu_2$ which produces homodyne signals. With $\nu_1 = \nu_2$ Eq. 3 becomes $$i(t) = \alpha\left\{\frac{E_1^2}{2} + \frac{E_2^2}{2} + E_1 E_2 \cos[\phi(t)]\right\} \quad (6)$$

Thus homodyne signals have even symmetry about zero frequency without the offset frequency $\nu_1 - \nu_2$ and therefore cannot be used to discriminate between positive and negative Doppler. In addition, the D-C terms $$\frac{E_1^2}{2} \text{ and } \frac{E_2^2}{2}$$

are not as easily eliminated by filtering from the information contained in the cosine term for the homodyne case as they are for the heterodyne case.

If the more common multi-mode laser is employed in interferometry instead of the gaseous laser of the present invention, the analysis is much more complicated. Both heterodyne and homodyne signal spectra result that may overlap for sufficiently high target velocities and thereby interfere with each other. The technique of mode locking to produce constructive heterodyne interference from the multimodes does not eliminate the strong fixed frequency beats that occurs in the center of the heterodyne information bands spaced at frequency intervals $c/2L$ which the present invention does. These strong fixed frequency beats usually tend to saturate the detection system and thus reduce sensitivity to desired signals.

Operation of the present embodiment of the invention will be continued with reference to FIGURES 3 and 4. In FIGURE 3, the phase modulation produced by the motion of mirror 24 is shown. The upper trace, designated 3A, indicates the peak to peak sinusoidal mirror displacement of about 10 nano-meters at 1200 Hz. The lower trace, designated 3B, shows the resulting peak to peak Doppler shift of about 200 Hz., the optical heterodyne signal detected with a suitable receiver arrangement, such as that shown in FIGURE 1. It should be noted that the velocity trace (3B) is the time derivative of the displacement trace (3A).

In FIGURE 4, the phase modulation produced by the motion of mirror 25 is shown. The upper trace, designated 4A, shows the beat signal $\nu_1 - \nu_2 = 205$ mHz. when it is displayed on a spectrum analyzer with 3 kHz. resolution. There is no Doppler shift present. The trace, designated 4B, shows the resolved spectrum when mirror 24 of the interferometer arrangement is sinusoidally displaced at 10 kHz. The amplitude of modulation has been adjusted to produce the first carrier null. The trace designated 4C, shows the display the same as trace 4A or 4B, with either interferometer arm blocked. This trace illustrates the fact that no $\nu_1$ energy is present in the $\nu_2$ arm of the interferometer and vice versa. Thus, in accordance with the present invention, excellent separation of the reference signal from the transmitted carrier signal is achieved.

From the foregoing discussions and displays shown in FIGURES 3 and 4, it can readily be seen that the present invention provides the advantage of distinguishing the sign and magnitude of Doppler returns rather than the magnitude alone, as is the case with prior art devices. Several other advantages are derived such as, the intermediate frequency amplification can be done above the region of low frequency detector noise and the discrimination against interfering background photons is possible. Both of these advantages occur because intermediate frequency filtering can be employed to separate the desired signal from detector and background noise. These and other signal processing advantages result from apply-well known superheterodyne techniques to optical signals derived by the present invention.

Another important feature of the present system is predicated upon the inherent frequency stability between the two output oscillations, shown in FIGURE 2. As shown $\nu_1$ and $\nu_2$ are separated from one another and are circularly-polarized. Thus stability of operation results from the fact that both oscillations are simultaneously generated at different axial mode frequencies within the same optical cavity 11 and have constant frequency separation. Mechanical or thermal perturbation thus have little effect on the difference frequency ($\nu_2-\nu_1$) and the stability of the laser output.

Figure 5:
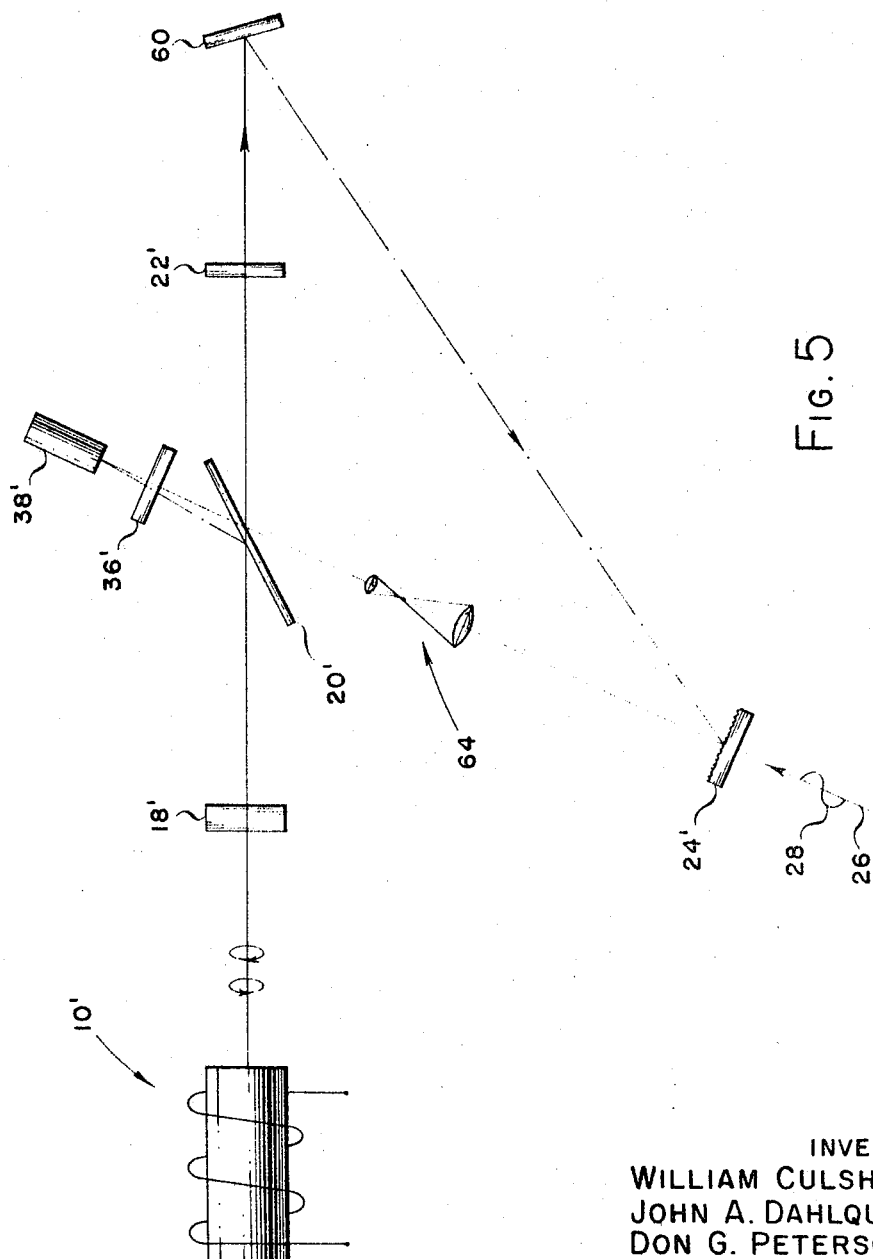
FIGURE 5 is another embodiment of the present invention.

With reference to FIGURE 5, there is shown another embodiment of the present invention. As shown in FIGURE 5, a gas laser 10', a quarter wave plate 18', a polarizer 22', an analyzer 36', and a photodetector 38', corresponding to the elements of similar designations in FIGURE 1 are shown. In addition, a partial mirror 20', is utilized which is disposed along axis 16 at Brewster's angle.

A reflective mirror 60 is provided to direct the target detection signal toward a non-specular target 24' which is subjected to vibratory motion. Target 24' may be a mirror or any surface for reflecting light. As a non-specular target an impinging light signal does not remain collimated and therefore must be collimated again by a suitable lens system 64 such as that illustrated. The collimated light from lens system 64 is directed to photodetector 38' through partial mirror 20' whereupon a component of the reference and Doppler shifted or target detection signals are selected by analyzer 36' which produce an output from photodetector 38 similar to that produced by the embodiment shown in FIGURE 1.

It is to be understood that the above described embodiments are only illustrative of the principles applicable to the invention. Numerous other arrangements and modifications may be defined by those skilled in the art without departing from the spirit and scope of the invention. For example, if the signal applied to mirror 24 for modulation were a voice signal in place of the sine wave illustrated and the output from photodetector resulting therefrom is fed into a phase modulation detector a replica of the voice signal applied to mirror 24 will be developed. Consequently, the present invention is readily useful for communication systems. Accordingly, it is to be understood that the present invention is limited only by the spirit and scope of the appended claims.

We claim:
1. An improved optical system for vibration detection which comprises,
   (a) laser means for generating an optical beam having at least two oscillation modes of different frequencies and being opposite circular-polarized energy waves, said laser means having a first axis,
   (b) means disposed along said first axis for converting said opposite circular-polarized energy waves into orthogonal linearly polarized energy waves,
   (c) interferometer means disposed along said first axis for splitting said energy waves into at least first and second waves of different linear polarization, said first wave being directed along said first axis and said second wave being directed along a second axis intersecting said first axis at right angles,
   (d) first means for first modulating the frequency of said first energy wave and for then reflecting said first modulated energy wave back to said interferometer means along said first axis,
   (e) second means for reflecting said second energy wave without modulation back to said interferometer along said second axis,
   (f) third means along said second axis for receiving and recombining said first reflected frequency modulated energy wave with said second reflected unmodulated energy wave both from said interferometer to form a composite energy wave of co-polarized and co-collimated signal components of said reflected energy waves, and
   (g) fourth means along said second axis for receiving said composite energy wave to produce heterodyne interference signals for phase modulation detection.

2. The improved optical system defined in claim 1 wherein said laser means is further defined as having a cylindrical configuration in axial alignment with said first axis, said laser means having a uniform steady state magnetic field with field lines threading through said laser parallel to said first axis.

3. The improved optical system defined in claim 2 wherein said interferometer means is further defined as having a beam splitter disposed at the intersection of said first and second axes, a first polarizer disposed along said first axis between said beam splitter and said first means for filtering out all linear polarized waves except said first linear polarized energy wave, and a second polarizer disposed along said second axis between said beam splitter and said second means for filtering out all waves except said second linear polarized energy wave.

4. The improved optical system defined in claim 3 wherein said third means is disposed along said second axis between said beam splitter and said fourth means, said third means being further defined as an analyzer.

5. The improved optical system defined in claim 4 wherein a plane surface of said analyzer is perpendicular to said second axis and said plane surface of said analyzer is rotated 45° about said second axis.

6. An improved optical system for vibration detection which comprises,
   (a) laser means for generating an optical beam having at least two oscillation modes of different frequencies and being opposite circular polarized energy waves, said means having a first axis,
   (b) means disposed along said first axis for converting said opposite circular polarized energy waves into orthogonal lineraly polarized energy waves,
   (c) interferometer means disposed along said first axis for splitting said energy waves into at least first and second waves of different polarization, said first wave being directed along said first axis and said second wave being directed along a second axis intersecting said first axis,
   (d) means for deflecting said first energy wave from said first axis, and for modulating the frequency of said first energy wave and for then reflecting said first modulated energy wave back to said interferometer means along said second axis,
   (e) means along said second axis for receiving and recombining said first frequency modulated energy wave with said second energy wave from said interferometer to form a composite energy wave of co-polarized and co-collimated signal components of said first and second energy waves, and (f) means along said second axis for receiving said composite energy wave to produce herterodyne interference signals for phase modulation detection.

7. In a communication system having a first apparatus for detecting optical signals and for reproducing messages from the detected optical signals, and a second apparatus for phase modulating an optical beam with message signals which may subsequently be transmitted with the message signals superimposed thereon, said second apparatus for superimposing message signals on the optical beam comprises, (a) a single source for generating optical energy oscillations having at least two different axial mode frequencies of opposite circular polarized waves, said source having a first axis, (b) means disposed along said first axis for converting said opposite circular polarized energy waves into first and second orthogonal linearly polarized energy waves, (c) interferometer means disposed along said first axis for splitting said energy waves into at least two directions, said first wave being directed along said first axis of 0° polarization and said second wave being directed along a second axis intersecting said first axis of 90° polarization, (d) means for first modulating the frequency of said first energy wave and for then reflecting said modulated energy wave back to said interferometer means, (e) means for reflecting said second energy wave without modulation, back to said interferometer along said second axis, and (f) means for propagating said reflected frequency modulated and unmodulated waves together along said second axis as co-polarized and co-collimated signal components proportional to said reflected waves in a predetermined time-space relationship to produce optical heterodyne interference signals for detection and reproduction of messages by the communication system.

References Cited

UNITED STATES PATENTS

| | | |
|---|---|---|
| 2,385,086 | 9/1945 | D'Agostino et al. |
| 3,170,122 | 2/1965 | Bennett _____ 250—199 X |
| 3,175,088 | 3/1965 | Herriott _____ 250—199 |
| 3,231,741 | 1/1966 | Siegman _____ 250—199 |
| 3,258,597 | 6/1966 | Forrester _____ 250—199 |
| 3,277,396 | 10/1966 | Statz et al. _____ 250—199 X |
| 3,302,027 | 1/1967 | Fried et al. _____ 250—199 |

ROBERT L. GRIFFIN, Primary Examiner

BENEDICT V. SAFOUREK, Assistant Examiner

U.S. Cl. X.R.

332—7.51; 350—147